US012665490B2

(12) United States Patent
Song

(10) Patent No.: US 12,665,490 B2
(45) Date of Patent: Jun. 23, 2026

(54) CONVERTER WITH HOLD-UP CIRCUIT AND INRUSH-CONTROL CIRCUIT

(71) Applicant: Murata Manufacturing Co., Ltd., Nagaokakyo (JP)

(72) Inventor: Wei Song, Westborough, MA (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 469 days.

(21) Appl. No.: 17/629,162

(22) PCT Filed: Jul. 29, 2020

(86) PCT No.: PCT/US2020/043976
§ 371 (c)(1),
(2) Date: Jan. 21, 2022

(87) PCT Pub. No.: WO2021/021870
PCT Pub. Date: Feb. 4, 2021

(65) Prior Publication Data
US 2022/0271670 A1     Aug. 25, 2022

Related U.S. Application Data

(60) Provisional application No. 62/879,641, filed on Jul. 29, 2019.

(51) Int. Cl.
*H02M 1/32*          (2007.01)
*H02M 1/00*          (2007.01)
(Continued)

(52) U.S. Cl.
CPC ........... *H02M 1/32* (2013.01); *H02M 1/0096* (2021.05); *H02M 1/36* (2013.01); *H02M 3/33571* (2021.05); *H02M 1/007* (2021.05)

(58) Field of Classification Search
CPC ......... H02M 1/0096; H02M 1/32; H02M 1/36
See application file for complete search history.

(56)                References Cited

U.S. PATENT DOCUMENTS 5,010,293  A      4/1991  Ellersick
5,602,726  A      2/1997  Sakai
(Continued)

FOREIGN PATENT DOCUMENTS

CN      208209812  U      12/2018
EP        0200656  A1     11/1986
EP      3 282 571  A1      2/2018

OTHER PUBLICATIONS

Official Communication issued in International Patent Application No. PCT/US2020/043976, mailed on Nov. 9, 2020.
(Continued)

*Primary Examiner* — Gustavo A Rosario-Benitez
(74) *Attorney, Agent, or Firm* — Keating & Bennett, LLP

(57)                ABSTRACT

A holdup circuit includes a high-voltage generation circuit that outputs a high voltage and a holdup capacitor charging/discharging circuit that includes a holdup capacitor that is charged by the high voltage output by the high-voltage generation circuit. An inrush control circuit includes a constant-current source that includes a first transistor and a second transistor. During start-up, input current flows through the second transistor, and after start-up and during normal operation, the input current flows through the first transistor.

17 Claims, 5 Drawing Sheets

100

DC-DC CONVERTER BLOCK DIAGRAM

(51) Int. Cl.
    *H02M 1/36*        (2007.01)
    *H02M 3/335*     (2006.01)

(56)          References Cited

U.S. PATENT DOCUMENTS

| | | | | |
|---|---|---|---|---|
| 5,828,207 | A * | 10/1998 | Saadeh | H02J 9/061 |
| | | | | 307/66 |
| 5,847,942 | A * | 12/1998 | Bazinet | H02M 1/4258 |
| | | | | 363/40 |
| 6,043,705 | A * | 3/2000 | Jiang | H02M 1/4208 |
| | | | | 327/589 |
| 6,735,064 | B2 * | 5/2004 | Miyazaki | G05F 1/652 |
| | | | | 323/299 |
| 7,408,795 | B2 | 8/2008 | Vinciarelli | |
| 8,736,240 | B2 * | 5/2014 | Liu | H02M 3/335 |
| | | | | 307/46 |
| 8,872,485 | B1 | 10/2014 | Kung | |
| 2002/0080630 | A1 | 6/2002 | Hodge, Jr. | |
| 2008/0031014 | A1 | 2/2008 | Young | |
| 2010/0014330 | A1 | 1/2010 | Chang et al. | |
| 2011/0075447 | A1 * | 3/2011 | Clemo | H02M 1/15 |
| | | | | 363/20 |
| 2014/0254201 | A1 * | 9/2014 | Shih | H02M 1/4258 |
| | | | | 363/15 |
| 2014/0334200 | A1 | 11/2014 | Chui et al. | |
| 2017/0126134 | A1 | 5/2017 | Young | |
| 2018/0254696 | A1 * | 9/2018 | Machado | B23K 9/1006 |

OTHER PUBLICATIONS

Extended European Search Report in EP20848599.5, mailed Nov. 9, 2022, 18 pages.

\* cited by examiner

HIGH-VOLTAGE GENERATION CIRCUIT

HOLDUP CAPACITOR CHARGING/DISCHARGING CIRCUIT

INRUSH CONTROL TO LIMIT THE START UP CURRENT OF DC CONVERTER WITH LARGE INPUT CAPACITORS

VOUT 300W 85, 86 — ORING FETs AND DROOPING CONTROL

90 — SR/ DIODES AND FILTER

VOUT & LOUT

50 — TRANSFORMER

40 — HALF-BRIDGE

70 — CONTROLLER (DAUGHTER BOARD)

80 — AUXILIARY CONVERTER (DAUGHTER BOARD)

VB110V TO 160V

30 — BOOST

20 — INRUSH CONTROL 60, 65 — HOLD UP CAP AND CONTROL CIRCUIT

10 — INPUT FILTER/SURGE PROTECTION

VIN 16V ~ 160V

VIN 16V ~ 160VDC CONTINUOUS (14.4V ~ 168V 100 mS TRANSIENT

100

DC-DC CONVERTER BLOCK DIAGRAM

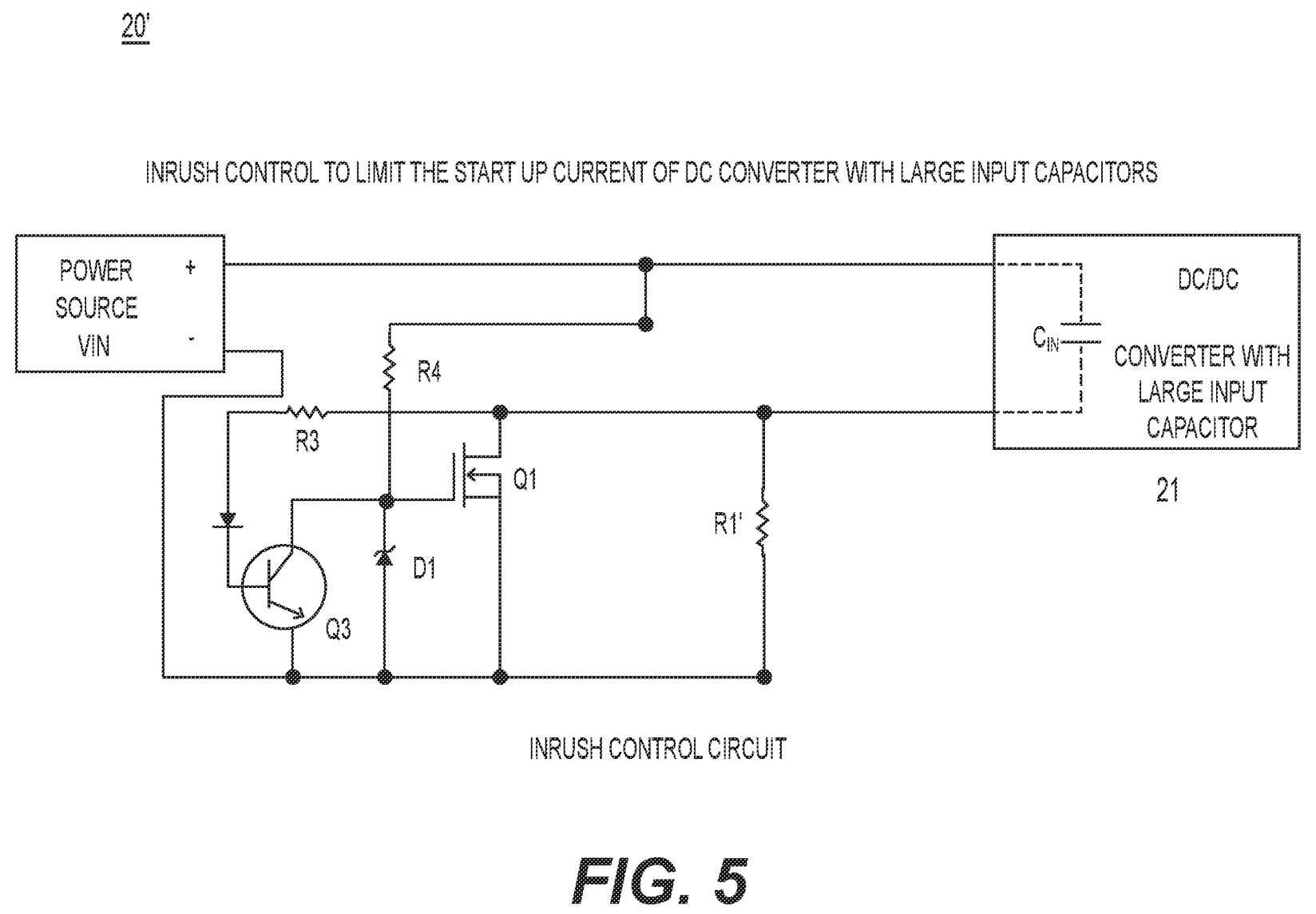

INRUSH CONTROL TO LIMIT THE START UP CURRENT OF DC CONVERTER WITH LARGE INPUT CAPACITORS

DC/DC

CONVERTER WITH
LARGE INPUT
CAPACITOR $C_{IN}$

21

R1'

Q1

R4

D1

R3

Q3

POWER
SOURCE
VIN

+

−

20'

INRUSH CONTROL CIRCUIT

*FIG. 5*

CONVERTER WITH HOLD-UP CIRCUIT AND INRUSH-CONTROL CIRCUIT

BACKGROUND OF THE INVENTION

1. Field of the Invention

The present invention relates to converters. More specifically, the present invention relates to converters with a hold-up circuit and/or an inrush-control circuit.

2. Description of the Related Art

It is known that, during startup, a large inrush current can cause a high initial voltage, which can cause an over-voltage transient. An over-voltage transient can decrease the lifetime of a converter (for example, a voltage converter), and/or can decrease the lifetime of the input switches (in particular, primary-side switches of the converter).

Hold-up time and the like are principal design considerations when designing a converter. When the input power to the converter is interrupted or lost, the output voltage of the converter continuously drops. Hold-up time is the amount of time that a converter can maintain an output voltage level within its rated output voltage range after the input power is interrupted or lost. Accordingly, it is can be desirable in some applications to increase the hold-up time as much as possible without sacrificing other design considerations.

SUMMARY OF THE INVENTION

To overcome the problems described above, preferred embodiments of the present invention provide (1) a holdup circuit that includes a high-voltage generation circuit and a holdup capacitor charging and discharging circuit, and (2) an inrush control circuit that limits the power-up input current of a converter to a predetermined value to charge an input capacitor in the converter using a constant-current source.

According to a preferred embodiment of the present invention, a holdup circuit includes a high-voltage generation circuit that outputs a high voltage and a holdup capacitor charging/discharging circuit that includes a holdup capacitor that is charged by the high voltage output by the high-voltage generation circuit.

The high-voltage generation circuit can include a push-pull converter. The high-voltage generation circuit can include a transformer with primary and secondary windings, a driver connected to the primary windings, and an oscillator that generates a high-frequency symmetric square wave that is applied to the driver. The high-frequency symmetric square wave generated by the oscillator may have a frequency between about 10 kHZ and about 1 MHz. The high-voltage generation circuit can include a DC blocking capacitor between the driver and the transformer. The holdup capacitor charging/discharging circuit can include at least one Zener diode that limits the voltage of the holdup capacitor.

The holdup capacitor charging/discharging circuit can include a transistor and a resistor that are each connected to the holdup capacitor, and a charging current of the holdup capacitor can be limited to:

$$\frac{\text{a base-emitter voltage of the transistor}}{\text{a resistance of the resistor}}.$$

According to a preferred embodiment of the present invention, a DC-DC converter includes the holdup circuit according to one of the other various preferred embodiments of the present invention. The holdup capacitor provides energy to the DC-DC converter when an input voltage of the DC-DC converter is interrupted.

The holdup capacitor charging/discharging circuit can include an optocoupler, and when the optocoupler receives a holdup control signal, the holdup capacitor can charge a capacitor connected to a voltage bus of the DC-DC converter.

According to a preferred embodiment of the present invention, an inrush control circuit includes a constant-current source that includes a first transistor and a second transistor. During start-up, input current flows through the second transistor, and after start-up and during normal operation, the input current flows through the first transistor.

The inrush control circuit can further include a third transistor connected to the gate of the first transistor, a fourth transistor connected to the gate of the second transistor, and a first resistor connected to the second transistor such that the input current flows through the first resistor. During startup, the input current can be limited to:

$$\frac{\text{a base-emitter voltage of the second transistor}}{\text{a resistance of the first resistor}}.$$

After startup and during normal operation, the third transistor can turn on, causing the input current to flow through the first transistor.

The inrush control circuit can further include a first resistor connected to a gate of the first transistor and a second resistor connected to a gate of the second transistor. The inrush control circuit can further include a first Zener diode that is connected to the gate of the first transistor and that limits a gate-source voltage of the first transistor and a second Zener diode that is connected to the gate of the second transistor and that limits a gate-source voltage of the second transistor.

According to a preferred embodiment of the present invention, a DC-DC converter includes the inrush control circuit according to one of the various preferred embodiments of the present invention, wherein the input current charges an input capacitor of the DC-DC converter.

According to a preferred embodiment of the present invention, a DC-DC converter includes an input voltage terminal, a voltage-conversion stage connected to the input voltage terminal, an output terminal connected to the voltage-conversion stage, and a holdup circuit according to one of the various preferred embodiments of the present invention connected to an input of the voltage-conversion stage.

The voltage-conversion stage can include a switching circuit, a transformer connected to the switching circuit, a rectification and filter circuit connected to the transformer, and the output terminal is connected to the voltage-conversion stage through the rectification and filter circuit.

The DC-DC converter can further include an input filter connected to the input voltage terminal, an inrush control circuit connected to the input filter, a boost circuit connected to the inrush control circuit, and a controller that regulates an output voltage and/or an output current of the output terminal. The input voltage terminal can be connected to the voltage-conversion stage through the input filter, the inrush control circuit, and the boost circuit.

The DC-DC converter can further include an inrush control circuit that includes a constant-current source that includes a first transistor and a second transistor. During start-up, input current can flow through the second transistor, and after start-up and during normal operation, the input current can flow through the first transistor. The inrush control circuit can further include a third transistor connected to a gate of the first transistor, a fourth transistor connected to a gate of the second transistor, and a first resistor connected to the second transistor such that the input current flows through the first resistor. During startup, the input current can be limited to:

$$\frac{\text{a base–emitter voltage of the second transistor}}{\text{a resistance of the first resistor}}.$$

After startup and during normal operation, the third transistor can turn on, causing the input current to flow through the first transistor.

The inrush control circuit can further include a first resistor connected to a gate of the first transistor and a second resistor connected to a gate of the second transistor. The inrush control circuit can further include a first Zener diode that is connected to the gate of the first transistor and that limits a gate-source voltage of the first transistor and a second Zener diode that is connected to the gate of the second transistor and that limits a gate-source voltage of the second transistor.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 5 is a circuit diagram of another inrush control circuit.

DETAILED DESCRIPTION OF PREFERRED EMBODIMENTS

Figure 1:
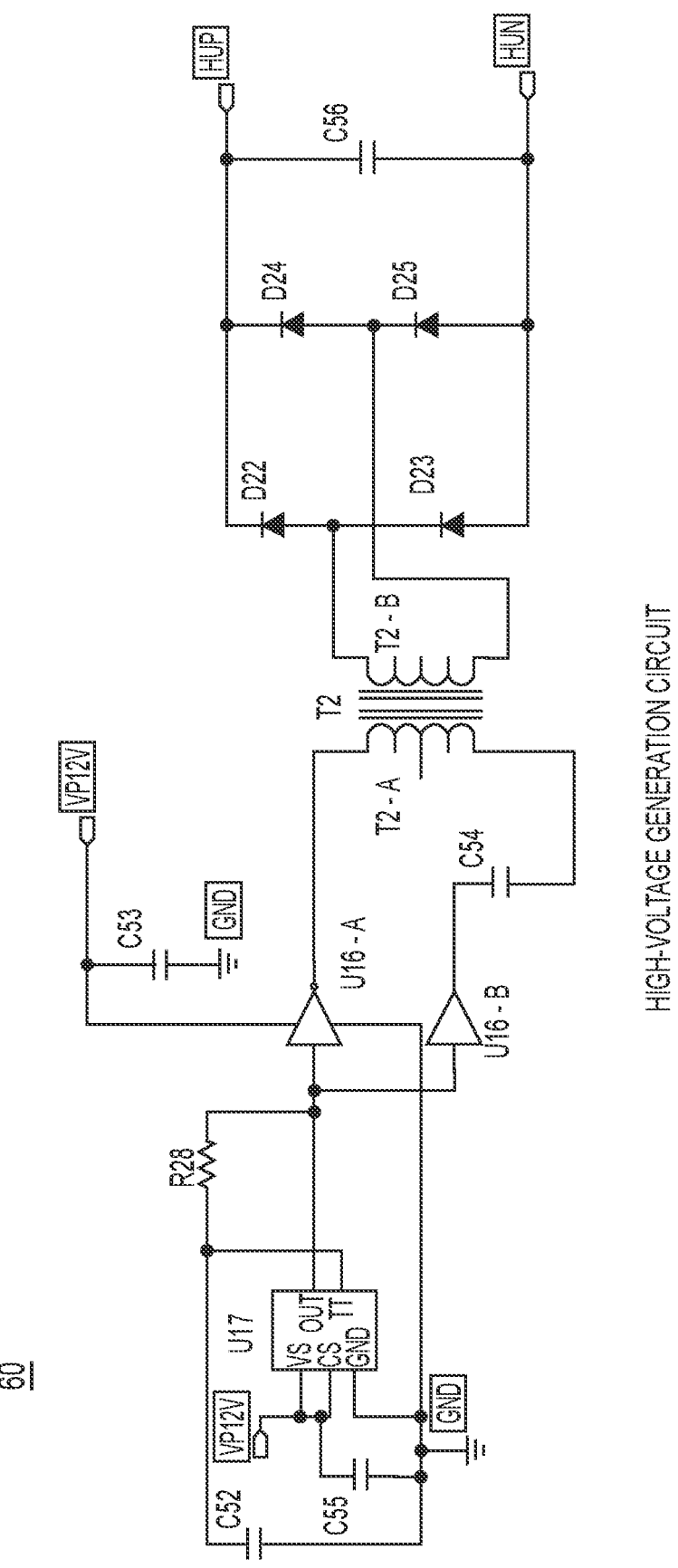
FIG. 1 is a circuit diagram of a high-voltage generation circuit.
Figure 2:
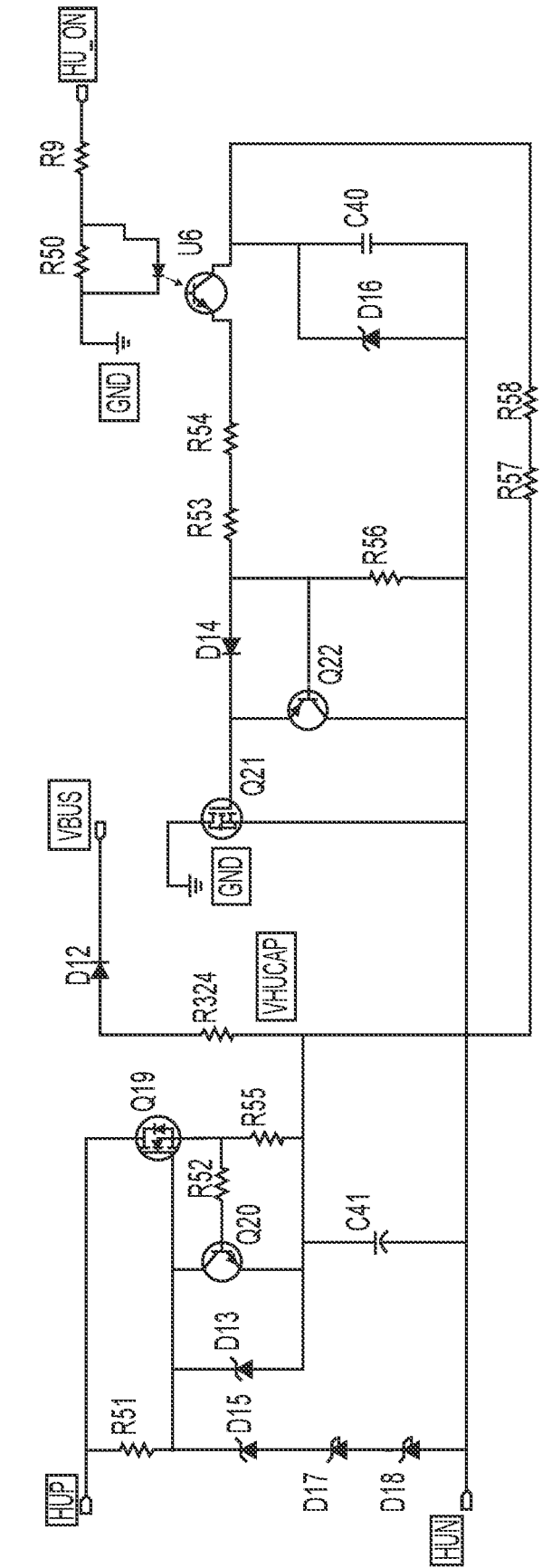
FIG. 2 is a circuit diagram of a holdup capacitor charging/discharging circuit.
Figure 3:
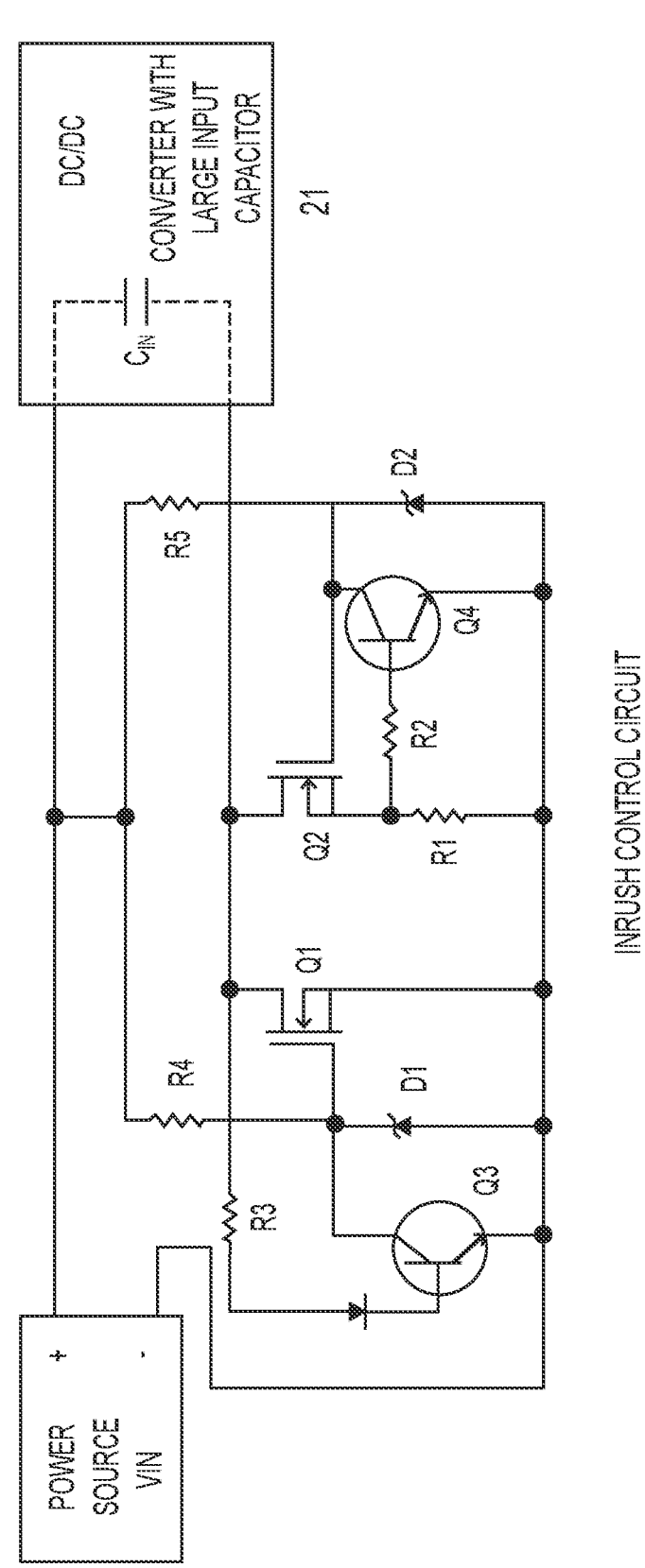
FIG. 3 is a circuit diagram of an inrush control circuit.
Figure 4:
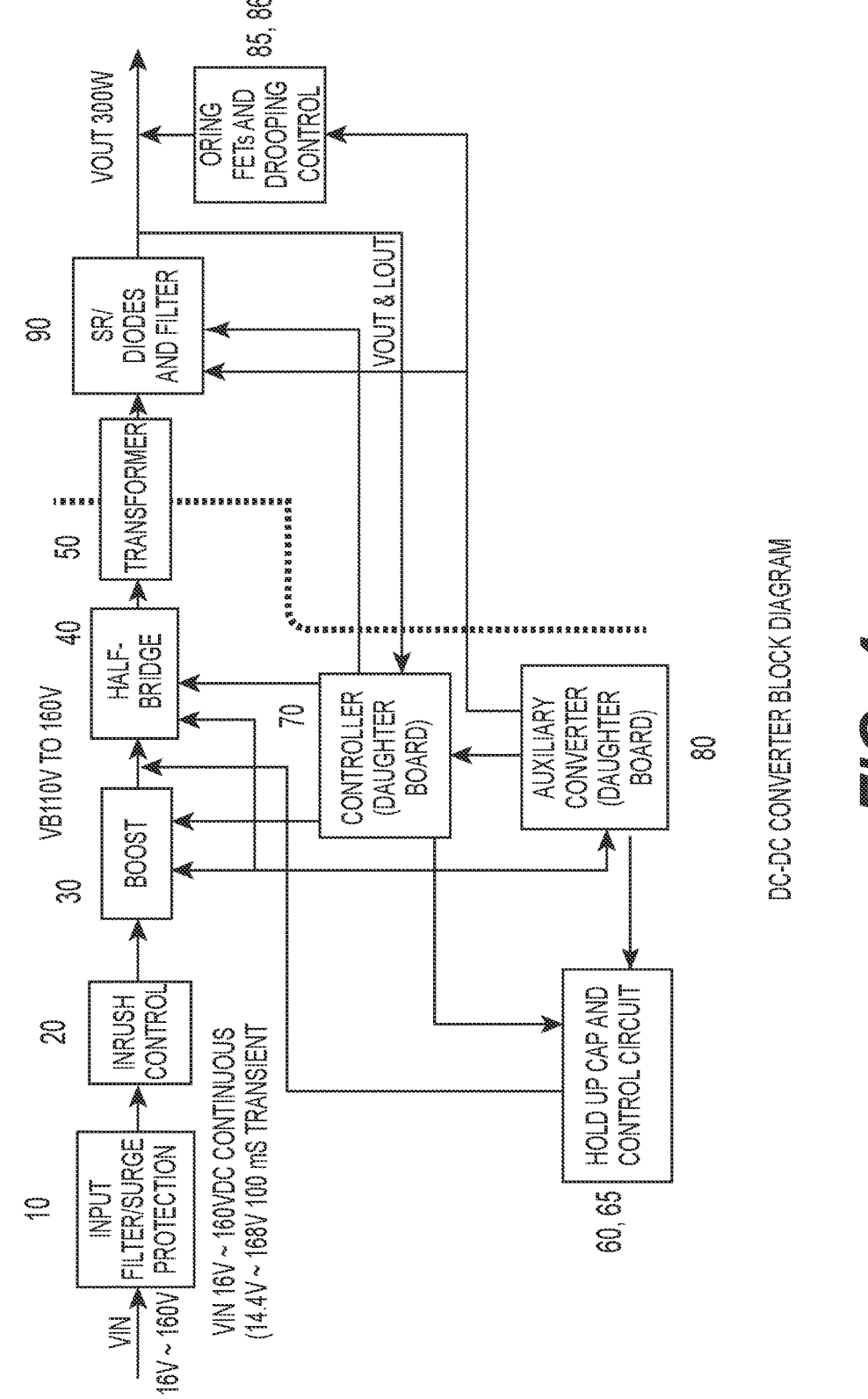
FIG. 4 is a block diagram of an example of a DC-DC converter.

FIG. 4 shows an example of a DC-DC converter 100 that can be used with the high-voltage generation circuit 60 shown in FIG. 1, the holdup capacitor charging/discharging circuit 65 shown in FIG. 2, and the inrush control circuit 20 shown in FIG. 3. The DC-DC converter 100 shown in FIG. 4 is an example only, and the high-voltage generation circuit 60 shown in FIG. 1, the holdup capacitor charging/discharging circuit 65 shown in FIG. 2, and the inrush control circuit 20 shown in FIG. 3. can be used with other converters.

The DC-DC converter 100 shown in FIG. 4 can be used with an ultra-wide continuous input-voltage range from about 16 V to about 160 V and can accept battery voltages of, for example, 24 V, 36 V, 48 V, 72 V, 96 V, and 110 V. The DC-DC converter 100 shown in FIG. 4 can accept an input voltage Vin with a transient input voltage range of about 14.4 V to about 168 V for 100 ms. FIG. 4 shows a dashed line through the transformer 50 that shows the isolation of the DC-DC converter 100.

As shown in FIG. 4, the DC-DC converter 100 can include an input voltage Vin (for example, an input voltage terminal), an input filter/surge protection circuit 10, an inrush control circuit 20, a boost circuit 30, a switching circuit 40 (shown as a half-bridge circuit in FIG. 4), a transformer 50, a rectification and filter circuit 90 (shown as SR/diodes and a filter in FIG. 4), and an output voltage Vout (for example, an output voltage terminal). The DC-DC converter 100 can also include a controller 70, a holdup circuit 60, 65, an auxiliary converter 80, an ORing circuit 85, and a droop control circuit 86. As shown in FIG. 4, the ORing circuit 85 includes ORing FETs (field effect transistors).

The switching circuit 40 is shown as a half-bridge circuit in FIG. 4, but other topologies are also possible, including, for example, a full-bridge circuit.

The ORing circuit 85 and the droop control circuit 86 enable the outputs of multiple DC-DC converters (for example, DC-DC converter 100) to be connected in parallel to provide high output power or to provide high reliability with N+1 redundancy operation. If multiple DC-DC converters are connected in parallel, the outputs of the multiple DC-DC converters can use passive current sharing through output droop such that the output voltage decreases when the output current increases.

The rectification and filter circuit 90 can include synchronous rectifiers (SR) and/or diodes to provide rectification. However, any suitable filter(s) can be used in the rectification and filter circuit 90.

The auxiliary converter 80 can be located on a daughter board or a daughter card. The auxiliary converter 80 can provide power, for example, to any of the controller 70, the holdup circuit 60, 65, the boost circuit 30, the switching circuit 40, the rectification and filter circuit 90, the ORing circuit 85, and the droop control circuit 86. The auxiliary converter 80 can be a flyback converter that can generate four DC voltage outputs that provide bias voltages for other circuitry, including the boost circuit 30, the controller 70, the holdup circuit 60, 65, and the droop control circuit 86. The flyback converter can include a pulse-width modulation (PWM) controller, for example, a LM5022 controller manufactured by TEXAS INSTRUMENTS™ to generate regulated and isolated or non-isolated DC outputs.

The controller 70 can be located on a daughter board or a daughter card, for example, the same daughter board or daughter card as the auxiliary converter 80. The controller 70 can include one or more control circuits. As shown in FIG. 4, the controller 70 can monitor the output voltage Vout and/or the output current. In some applications, the controller 70 can also monitor the input voltage Vin and/or an input current. Based on the monitored parameter(s), the controller 70 can control the other circuits in the DC-DC converter 100, including, for example, the boost circuit 30, the switching circuit 40, the rectification and filter circuit 90, and the holdup circuit 60, 65. By controlling the other circuits in the DC-DC converter 100, the controller 70 can regulate the output voltage Vout and/or the output current. Although not explicitly shown in FIG. 4, the controller 70 can also control the ORing circuit 85 and the droop control circuit 86. The controller 70 receives input and output voltage and input and output current signals from other circuitry of the DC-DC converter 100 and then generates PWM control signals that are output to the boost circuit 30, the switching circuit 40, and the rectification and filter circuit 90. The controller 70 includes at least one first PWM controller as a boost control circuit and at least one second PWM controller as a half-bridge control circuit. For example, the boost control circuit can be a LM5022 controller manufactured by TEXAS INSTRUMENTS™, and the bridge control circuit can be a LM5039 controller manufactured by TEXAS INSTRU-MENTS™.

By providing the controller 70 and the auxiliary converter 80 on one or more daughter boards, the voltage converting circuitry of the DC-DC converter (including the input filter/surge protection circuit 10, the inrush control circuit 20, the boost circuit 30, the switching circuit 40, the transformer 50, and the rectification and filter circuit 90) can be provided on a circuit board or substrate with a reduced size, i.e., the DC-DC converter can be provided with a reduced footprint.

The DC-DC converter 100 can also include various protection circuit(s) other than the input filter/surge protection circuit 10 and inrush control circuit 20, including circuit(s) that, for example, detect input over/under voltage, output over voltage or output over current, over temperature, reverse polarity of input voltage Vin, etc.

The DC-DC converter 100 can include multiple-stage voltage conversion as shown in FIG. 4. Inrush current control circuit limits the power of inrush current to a predetermined value and protects an externally connected fuse or the like during power on.

The first stage of voltage conversion of the DC-DC converter 100, shown as the boost circuit 30 in FIG. 4, can be a current-mode-controlled boost converter with a PWM controller. The boost circuit 30 provides an output voltage VB (also referred to as Vbus) that is the input voltage of the second stage of voltage conversion of the DC-DC converter 100, at the switching circuit 40 (shown in FIG. 4 as the half-bridge circuit), the transformer 50, and the rectification and filter circuit 90 (the SR/diodes and filter circuits as shown in FIG. 4). The output voltage VB of the boost circuit 30 can be regulated to the range of about 110 V to about 125 V, for example. When the input voltage Vin is greater than a regulated boost output voltage, for example, about 125 V, the boost circuit 30 can be in a by-pass mode. In the by-pass mode, the input voltage Vin directly powers the switching circuit 40 (shown in FIG. 4 as the half-bridge circuit) through a boost diode (not shown) in the boost circuit 30.

The second stage of voltage conversion of the DC-DC converter 100 can be a voltage-mode-controlled converter with a PWM controller. The rectification and filter circuit 90 can include synchronous rectifiers (SR) and/or diodes that can provide full-wave rectification at the secondary side of the transformer 50 and can be followed by an LC filter to generate a regulated DC output.

The controller 70 and the control circuitry of the holdup capacitor charging/discharging circuit 65, which are control circuits for the first and second stages, can be typical application circuits. The second stage can have both voltage control and current control as feedback signals so that the output will be a constant current source when output over-current occurs. The inrush control circuit 20 can be a self-controlled circuit that does not receive a control signal from any other circuit.

The DC-DC converter 100 can be used for railway applications, meeting the EN50155 standard in a single package. The output voltage Vout can have a wide trim range of up to +15% of nominal voltage. The DC-DC converter 100 can have a constant current output profile suited for high inductive/capacitive loading applications.

The holdup circuit 60, 65 shown in FIG. 4 can include the high-voltage generation circuit 60 shown in FIG. 1 and the holdup capacitor charging/discharging circuit 65 shown in FIG. 2.

The high-voltage generation circuit 60 shown in FIG. 1 can be powered by a regulated voltage VP12V. The regulated voltage VP12V can be a 12 V regulated voltage from the auxiliary converter 80. The high-voltage generation circuit 60 can be a push-pull converter operating at 50% duty cycle. The oscillator U17 generates a high-frequency symmetric square wave that is applied to the drivers U16-A and U16-B. The high-frequency symmetric square wave generated by the oscillator U17 may have a frequency between about 10 kHZ and about 1 MHz. Capacitor C52 and resistor R28 determine an oscillation frequency of the oscillator U17. Drivers U16-A and U16-B drive the primary winding T2-A of the converter's transformer T2. Capacitors C53 and C55 are decoupling capacitors for the oscillator U17 and the drivers U16A and U16B, and capacitor C54 is a DC block-ing capacitor to tolerate any imperfections in the high-frequency symmetric square wave. The secondary winding T2-B of the converter's transformer T2 provides a higher voltage than the voltage on the primary winding T2-A and charges the output capacitor C56 through the full-bridge rectifier, including diodes D22, D23, D24 and D25, to about 180 V. The voltage VHUP_HUN across the output capacitor C56 is the input of the holdup capacitor charging/discharg-ing circuit 65 shown in FIG. 2.

The voltage VHUP_HUN of the high-voltage generation circuit 60 is input across the terminals HUP and HUN of the holdup capacitor charging/discharging circuit 65 shown in FIG. 2. The holdup capacitor C41 is charged through a constant-current source that includes transistors Q19, Q20, resistors R52, R55, and diode D13. The constant-current source can be small so that the total charging power is limited to less than about 1 W. As shown in FIG. 2, the transistor Q19 can be a metal-oxide-semiconductor field-effect transistor (MOSFET), and the transistor Q20 can be a bipolar junction transistor. Alternatively, transistors Q19, Q20 can be other suitable transistors. The charging current of the holdup capacitor C41 is limited to about Vbe/R55, where Vbe is the base-emitter voltage of the transistor Q20 and R55 is the resistance of resistor R55. The maximum voltage across the holdup capacitor C41 is set by Zener diodes D15, D17, D18 to about 165 V. The Zener diodes D15, D17, D18 can be replaced by a single Zener diode or any number of Zener diodes to set the maximum voltage to a predetermined value. A bias current for the Zener diodes D15, D17, D18 is set by resistor R51.

As shown in FIG. 2, the holdup capacitor charging/discharging circuit 65 includes an optocoupler U6, and a current limit and bias to the diode of the optocoupler U6 is set by resistors R9 and R50. The optocoupler U6 receives a holdup control signal HU_ON, which may be received from the controller 70. Resistors R53 and R54 provide voltages for testing the holdup capacitor charging/discharging circuit 65, and may be replaced by a single resistor or omitted from the holdup capacitor charging/discharging circuit 65. Resis-tor R65 provides a bias voltage for transistor Q22 during the discharging of the gate-source of transistor Q21, and diode D16 is a Zener diode that sets a gate-source voltage of transistor Q21.

When interruption of the input voltage Vin occurs, for example, when the input voltage Vin is lower than about 14.4 V, the holdup control signal HU_ON changes from low to high. The collector-emitter voltage Vce of the optocoupler U6 is on, and the gate-source voltage Vgs of transistor Q21 increases by the voltage across C40. The transistor Q21 is then turned on. As shown in FIG. 2, the transistor Q21 can be a MOSFET, but other transistors can also be used. The energy in the holdup capacitor C41 transfers through the diode D12 and the terminal VBUS to the capacitors that hold the bus voltage VB so that the output of the converter is not interrupted. The energy stored in the holdup capacitor 41 is transferred to the capacitors that hold the bus voltage VB until the voltage of the holdup capacitor C41 and capacitors on the bus voltage VB balance. After that, the holdup capacitor C41 and capacitors on the bus voltage VB continue to power the second stage to maintain the output voltage Vout uninterrupted. Resistor R324 limits the peak current of the holdup capacitor C41 during discharging. Voltage VHU-CAP is the voltage of the holdup capacitor C41 with reference to the voltage at terminal HUN.

As shown in FIG. 2, the holdup capacitor charging/discharging circuit 65 further includes a transistor Q22, a diode D14, and a resistor R56, which provide a driving circuit that decreases the turn-off speed of the transistor Q21.

In conventional holdup circuits, energy storage capacitors of a boost stage are typically connected to a voltage bus as an input to a half-bridge stage. Accordingly, the bus voltage must be kept high to ensure that the stored energy in the bus capacitors supplies power to the half-bridge stage during input-power interruption to maintain an uninterrupted output voltage. Thus, because the boost stage has a high output voltage, the duty cycle of a PWM control signal of the boost stage must have a wide range for applications that have ultra-wide input voltage ranges. These design requirements significantly decrease the efficiency of a boost stage converter and result in a circuit that is difficult to implement.

In contrast to conventional holdup circuits, the holdup circuit 60, 65 stores energy in the holdup capacitor C41. The holdup capacitor C41 is charged to a high voltage by the high-voltage generation circuit 60. During normal operation of the DC-DC converter 100, the holdup capacitor C41 does not interfere with operation of the holdup circuit 60, 65. However, during an input power interruption, the holdup capacitor C41 is connected to the terminal VBUS and provides energy to the switching circuit 40 to maintain an uninterrupted voltage at the output voltage Vout. Therefore, bus voltage VBUS can be optimized or improved for a corresponding duty cycle range of the boost circuit 30 with respect to a predetermined input voltage range. When the input voltage Vin is higher than an output voltage of the boost circuit 30, the boost circuit 30 can be bypassed.

If the second stage has an ultra-wide input voltage range over, for example, 10:1, to make it suitable for battery sources with different voltage levels, including, for example, typical 24 V, 36 V, 48 V, 72 V, 96 V, and 110 V batteries, then properly rated external fuse(s) must be selected, and inrush current should be limited to not trip the fuse(s). The inrush control circuit 20 can limit the power of inrush current to a desired value by using a constant current source as shown in FIG. 3. In FIG. 3, the power source can include the input voltage Vin and the input filter/surge protection circuit 10 shown in FIG. 4, and the DC-DC converter 21 can be the second stage shown in FIG. 4 that includes the switching circuit 40 (shown as the half-bridge circuit in FIG. 4), the transformer 50, and the rectification and filter circuit 90.

When the power source is connected to the inrush control circuit 20, transistor Q2 is turned on through resistor R5. Zener diode D2 limits the gate-source voltage Vgs of transistor Q2 within a safe voltage level. An input current is limited to a value that is determined by base-emitter voltage Vbe of transistor Q4, which can be about 0.7 V, and the resistance of resistor R1. The charging current to the input capacitor $C_{IN}$ of the DC-DC converter 21 is Vbe/R1. The input capacitor $C_{IN}$ will be charged with this current until the voltage across the input capacitor $C_{IN}$ increases to near the input voltage Vin of the power source. Then the voltage at the base of transistor Q3 will drop to the point that transistor Q3 will turn off. The gate-source voltage Vgs of transistor Q1 increases through resistor R4, charging the gate-source capacitance of transistor Q1. Zener diode D1 limits the gate-source voltage Vgs of transistor Q1 within safe voltage levels. Then the transistor Q1 is turned on. After the transistor Q1 is turned on, the inrush current control process is completed, and the inrush control circuit 20 enters normal operation, with the input current flowing through the drain and source of transistor Q1.

As shown in FIG. 3, transistors Q1, Q2 can be MOSFETs, and transistors Q3, Q4 can be bipolar junction transistors. But transistors Q1, Q2, Q3, Q4 can be any suitable transistor. Resistor R2 can be included to improve the performance of transistor Q4, but may also be omitted from the inrush control circuit 20.

FIG. 5 is a circuit diagram of another inrush control circuit 20'. As shown in FIG. 5, the resistor R1, the resistor R3, the resistor R5, the transistor Q2, the transistor Q4, and the Zener diode D2 shown in FIG. 3 are replaced by a resistor RV. Other elements of the inrush control circuit 20' shown in FIG. 5 can be the same as the elements of the inrush control circuit 21 shown in FIG. 3. When the input power source turns on in the inrush control circuit 20' shown in FIG. 5, the input capacitor $C_{IN}$ of the DC-DC converter 21 begins to charge through the resistor RV. When the voltage across the input capacitor $C_{IN}$ of the DC-DC converter 21 increases to near the input voltage Vin of the power source, the voltage at the base of transistor Q3 will drop to the point that the transistor Q3 will turn off. The gate-source voltage Vgs of transistor Q1 increases through the resistor R4, charging the gate-source capacitance of the transistor Q1. Zener diode D1 limits the gate-source voltage Vgs of transistor Q1 within safe voltage levels. Then the transistor Q1 is turned on. After the transistor Q1 is turned on, the inrush current control process is completed, and the inrush control circuit 20' enters normal operation, with the input current flowing through the drain and source of transistor Q1. With the inrush control circuit 20' shown in FIG. 5, the peak inrush current is input voltage Vin divided by the resistance of the resistor RV. A value of the resistor RV can be set according to a predetermined maximum value of the input voltage Vin divided by a predetermined maximum inrush current.

In conventional inrush control circuits, an input capacitor is typically charged via a resistor, which is bypassed with a controlled relay or semiconductor switch after a power supply is connected to an input of a voltage converter. Accordingly, a control signal is required to turn on the relay or the semiconductor switch.

In contrast to conventional inrush control circuits, the inrush control circuit 20 provides a constant current source to charge the input capacitor $C_{IN}$ while strictly controlling inrush current. In addition, the inrush control circuit 20' provides lower cost inrush control in which the input capacitor $C_{IN}$ is charged by the resistor RV. In each of the inrush controls circuits 20 and 20' shown in FIGS. 3 and 5, at an end of a process of charging the input capacitor $C_{IN}$, the transistor Q1 is turned on automatically to bypass either the constant current source or the resistor RV. Accordingly, no additional control signal is required.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A DC-DC converter comprising:
an input terminal and an output terminal;
a first stage that is connected to the input terminal and that provides a regulated voltage to a voltage bus; and
a second stage including:
a switching circuit connected to the voltage bus; and
a transformer including primary and secondary windings, the primary winding is connected to the switching circuit; and
a holdup circuit including:
a voltage generation circuit that outputs a holdup-charging voltage that is larger than a voltage of the voltage bus and that includes:
an additional transformer including primary and secondary windings;
a driver connected to the primary winding of the additional transformer; and
an oscillator that generates a symmetric square wave that is applied to the driver; and
a holdup capacitor charging/discharging circuit that includes a holdup capacitor that is charged by the holdup-charging voltage output by the voltage generation circuit, wherein
an output voltage of the holdup capacitor charging/discharging circuit is connected to the voltage bus; and
the regulated voltage is maintained within a predetermined voltage range independent of variations in an input voltage applied to the input terminal.

2. The DC-DC converter of claim 1, wherein the voltage generation circuit includes a push-pull converter.

3. The DC-DC converter of claim 1, wherein the voltage generation circuit includes a DC blocking capacitor between the driver and the additional transformer.

4. The DC-DC converter of claim 1, wherein the holdup capacitor charging/discharging circuit includes at least one Zener diode that limits the voltage of the holdup capacitor.

5. The DC-DC converter of claim 1, wherein:
the holdup capacitor charging/discharging circuit includes a transistor and a resistor that are each connected to the holdup capacitor; and
a charging current of the holdup capacitor is limited to:

$$\frac{a\ base-emitter\ voltage\ of\ the\ transistor}{a\ resistance\ of\ the\ resistor}.$$

6. The DC-DC converter of claim 1, wherein the holdup capacitor provides energy to the DC-DC converter when an input voltage to the input terminal of the DC-DC converter is interrupted.

7. The DC-DC converter of claim 6, wherein:
the holdup capacitor charging/discharging circuit includes an optocoupler; and
when the optocoupler receives a holdup control signal, the holdup capacitor charges a capacitor connected to the voltage bus of the DC-DC converter.

8. The DC-DC converter of claim 1, further comprising an inrush control circuit including:

10 a first transistor; and
a constant-current source that includes a second transistor; wherein
during start-up, an input current flows through the second transistor; and
after start-up and during normal operation, the input current flows through the first transistor.

9. A DC-DC converter comprising:
an input terminal and an output terminal;
a first stage that is connected to the input terminal and that provides a regulated voltage to a voltage bus; and
a second stage including:
a switching circuit connected to the voltage bus; and
a transformer including primary and secondary windings, the primary winding is connected to the switching circuit; and
a holdup circuit including:
a voltage generation circuit that outputs a holdup-charging voltage that is larger than a voltage of the voltage bus; and
a holdup capacitor charging/discharging circuit that includes a holdup capacitor that is charged by the holdup-charging voltage output by the voltage generation circuit;
an inrush control circuit including:
a first transistor; and
a constant-current source that includes a second transistor;
a third transistor connected to a gate of the first transistor;
a fourth transistor connected to a gate of the second transistor; and
a first resistor connected to the second transistor such that the input current flows through the first resistor; wherein
an output voltage of the holdup capacitor charging/discharging circuit is connected to the voltage bus;
during startup, an input current flows through the second transistor and is limited to:

$$\frac{a\ base-emitter\ voltage\ of\ the\ fourth\ transistor}{a\ resistance\ of\ the\ first\ resistor};$$

after startup and during normal operation, the third transistor turns off, causing the input current to flow through the first transistor.

10. The DC-DC converter of claim 8, further comprising:
a second resistor connected to a gate of the first transistor; and
a third resistor connected to a gate of the second transistor.

11. The DC-DC converter of claim 8, further comprising:
a first Zener diode that is connected to the gate of the first transistor and that limits a gate-source voltage of the first transistor; and
a second Zener diode that is connected to the gate of the second transistor and that limits a gate-source voltage of the second transistor.

12. The DC-DC converter of claim 8, wherein the input current charges an input capacitor of the DC-DC converter.

13. The DC-DC converter of claim 1, wherein
the second stage further includes a rectification and filter circuit connected to the transformer; and
the output terminal is connected to the transformer through the rectification and filter circuit.

14. The DC-DC converter of claim 1, further comprising:

an input filter connected to the input terminal;

a controller that regulates an output voltage and/or an output current of the output terminal; wherein the input terminal is connected to the switching circuit through the input filter and the first stage.

15. The DC-DC converter of claim 1, wherein the symmetric square wave generated by the oscillator has a frequency between about 10 KHZ and about 1 MHz.

16. The DC-DC converter of claim 1, wherein the first stage is a boost circuit.

17. A DC-DC converter comprising:

an input terminal and an output terminal;

a first stage that is connected to the input terminal and that includes a control circuit that controls the first stage to provide a regulated voltage within a predetermined range to a voltage bus; and a second stage including:
    a switching circuit connected to the voltage bus; and
    a transformer including primary and secondary windings, the primary winding is connected to the switching circuit; and
a holdup circuit including:
    a voltage generation circuit that outputs a holdup-charging voltage that is larger than a voltage of the voltage bus and that includes:
        an additional transformer including primary and secondary windings;
        a driver connected to the primary winding of the additional transformer; and
        an oscillator that generates a symmetric square wave that is applied to the driver; and
    a holdup capacitor charging/discharging circuit that includes a holdup capacitor that is charged by the holdup-charging voltage output by the voltage generation circuit, wherein
an output voltage of the holdup capacitor charging/discharging circuit is connected to the voltage bus.

\* \* \* \* \*